United States Patent
Jubin et al.

(10) Patent No.: US 7,862,169 B2
(45) Date of Patent: Jan. 4, 2011

(54) CONTACT LENSES AND METHODS FOR THEIR DESIGN

(75) Inventors: Philippe F. Jubin, Jacksonville, FL (US); Larry Jones, Apopka, FL (US); Jose L. Perez, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 330 days.

(21) Appl. No.: 11/536,958

(22) Filed: Sep. 29, 2006

(65) Prior Publication Data

US 2008/0079895 A1    Apr. 3, 2008

(51) Int. Cl.
    *G02B 7/02* (2006.01)
(52) U.S. Cl. ............... 351/177; 351/160 H; 351/160 R; 351/247; 351/178
(58) Field of Classification Search .................. 351/177
    See application file for complete search history.

(56) References Cited

U.S. PATENT DOCUMENTS

| | | | |
|---|---|---|---|
| 6,045,578 A | 4/2000 | Collins et al. | |
| 6,082,856 A | 7/2000 | Dunn | |
| 6,305,802 B1 | 10/2001 | Roffman et al. | |
| 6,511,179 B1 | 1/2003 | Davis et al. | |
| 6,626,535 B2 * | 9/2003 | Altmann | 351/177 |
| 6,899,425 B2 * | 5/2005 | Roffman et al. | 351/161 |
| 7,021,760 B2 | 4/2006 | Newman | |
| 7,556,375 B2 * | 7/2009 | Caroline et al. | 351/160 H |
| 2002/0176049 A1 | 11/2002 | Sakai | |
| 2004/0246440 A1 * | 12/2004 | Andino et al. | 351/177 |

FOREIGN PATENT DOCUMENTS

| | | |
|---|---|---|
| WO | WO 0002836 A1 | 5/2000 |
| WO | WO 0048036 A1 | 8/2000 |
| WO | WO 0101141 A1 | 2/2001 |
| WO | WO 0110633 A2 | 2/2001 |
| WO | WO 0208883 A1 | 11/2002 |
| WO | WO2004097502 A1 | 11/2004 |

OTHER PUBLICATIONS

International Search Report PCT/US2007/079848—Date of mailing May 16, 2008.

* cited by examiner

*Primary Examiner*—Jessica T Stultz

(57) ABSTRACT

The invention provides methods for designing contact lenses in which method the lens flexure is taken into account. The method of the invention is insensitive to the lens' back surface design and does not require complex back surface designs. Additionally, the lens design can be optimized virtually, eliminating the need for iterative design-test on-eye-re-design cycles.

12 Claims, 4 Drawing Sheets

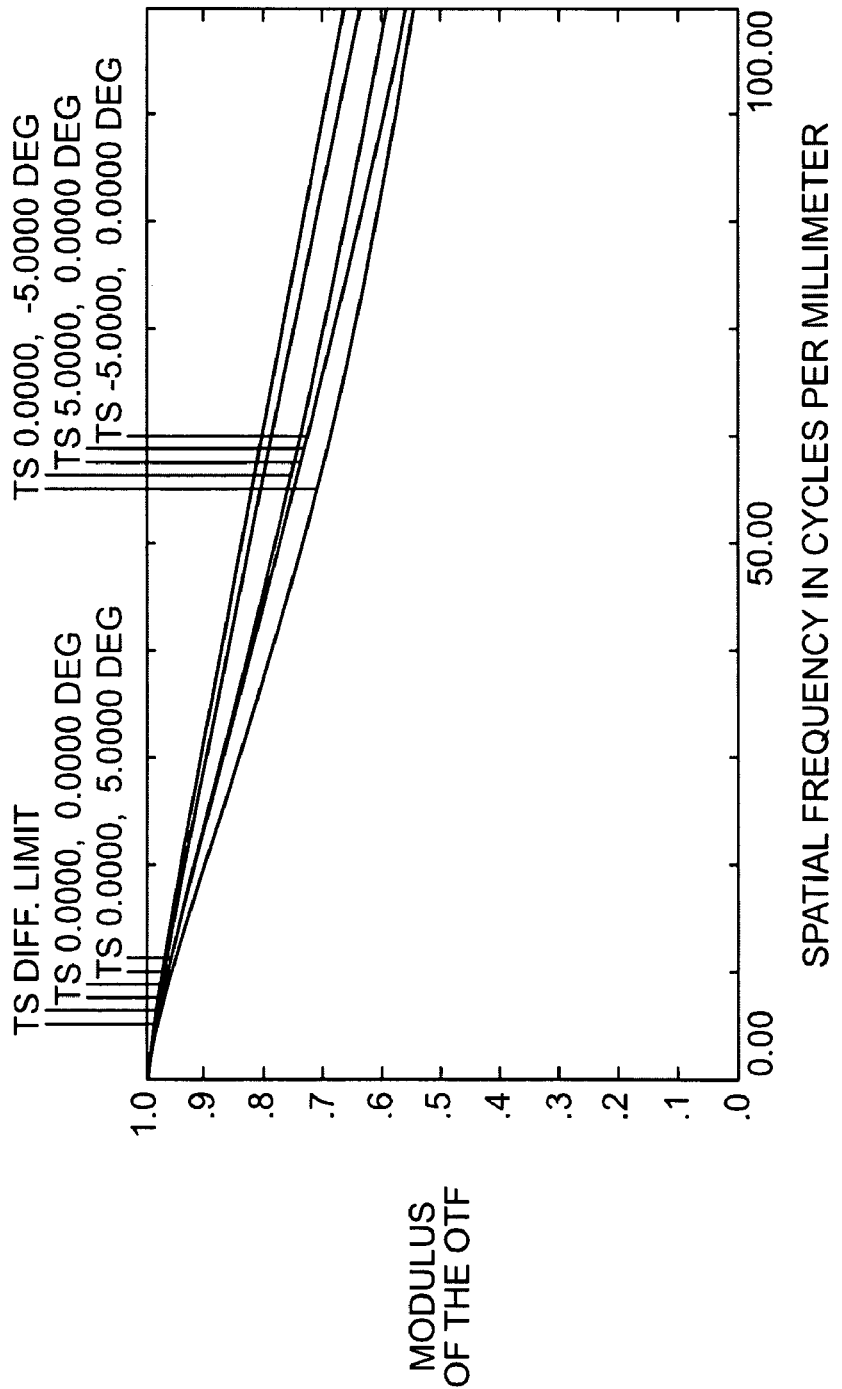

CONTACT LENSES AND METHODS FOR THEIR DESIGN

FIELD OF THE INVENTION

The present invention relates to the design and manufacture of ophthalmic lenses. In particular, the invention provides contact lenses in the design of which lens flexure is taken into account.

BACKGROUND OF THE INVENTION

The use of contact lenses incorporating on or more curvatures for the correction of an individual's visual acuity is well known. A portion of the conventionally available contact lenses are manufactured using soft lens materials. When the soft contact lens is placed on-eye, the curvature of the lens is altered because the soft lens will, to a certain extent, drape onto the cornea. This is known as lens wrapping or flexure. Flexure can affect different parameters of the lens, such as diameter, sagittal depth, and the front and back surface curvatures, to varying extents. For example, the sagittal depth may be reduced by 20 percent and the radius of curvature may vary by 5 percent. The extent to which the lens curvature is altered due to wrapping depends on the lens design, the mechanical characteristics of the lens material, and the on-eye environment, such as geometry, pH, temperature and the like.

Some known lens design methods attempt to take into account lens flexure. For example, it is known to design the back surface of the lens so that it is a substantially duplicate of, and fits, the wearer's corneal topography. However, this is disadvantageous because the corneal surface varies from person to person and this method requires customizing the lens' back surface design to the individual. Additionally, this method requires the design and manufacture of complex back surfaces for each lens. Finally, these lenses must maintain perfect translational and rotational alignment on the eye to be effective.

Another known lens design method is to provide a lens design, test the design on-eye, change the design based on the testing, and repeat each of these steps until the design is optimized. This method is costly and cumbersome.

BRIEF DESCRIPTION OF THE DRAWINGS

FIG. 2a is a polychromatic MTF graph of the lens-eye system of FIG. 1a in which the lens is optimized for wrapping.

DESCRIPTION OF THE INVENTION AND ITS PREFERRED EMBODIMENTS

Figure 1A:
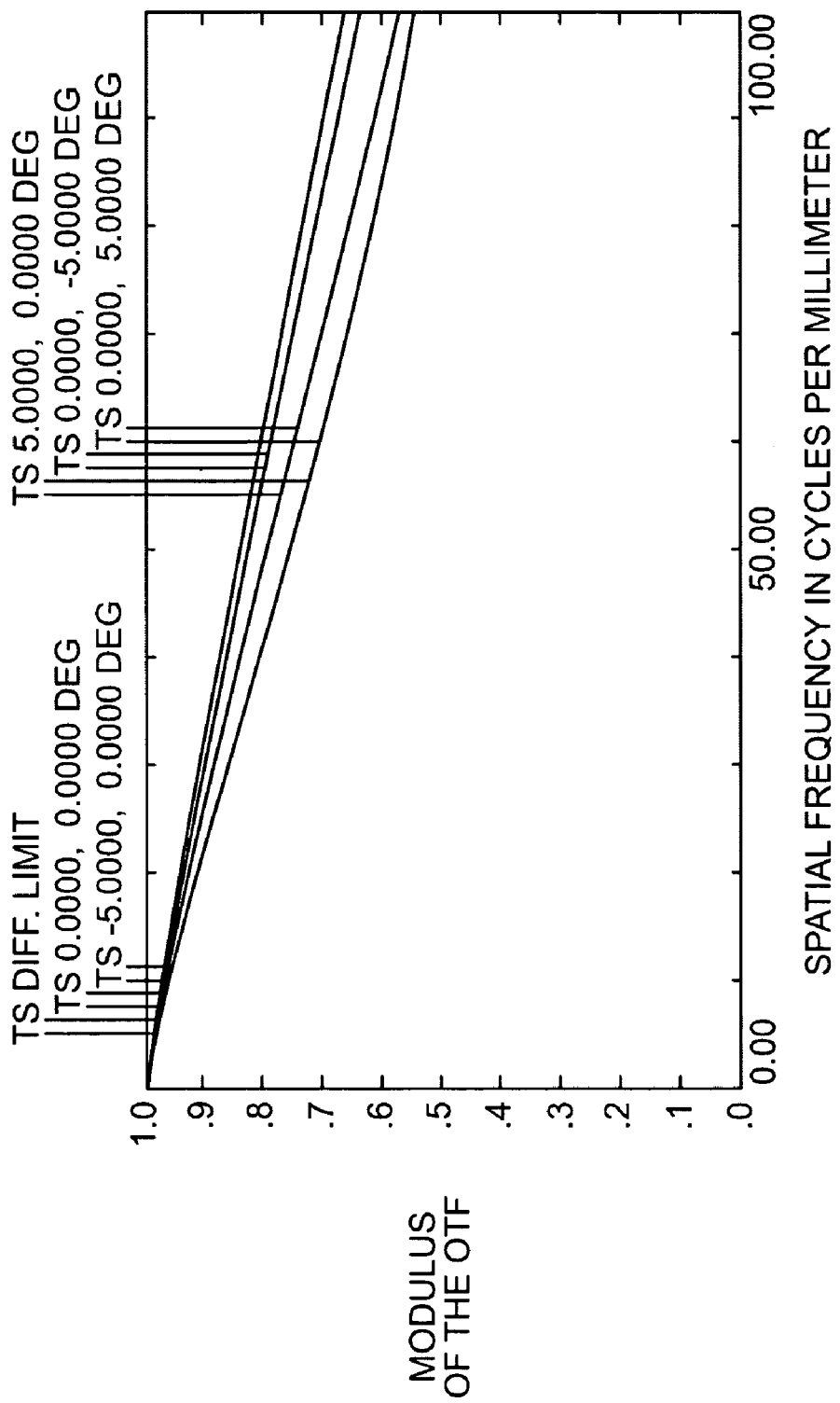
FIG. 1a is a polychromatic MTF graph of a lens-eye system with the lens centered.

The present invention provides methods for designing contact lenses and lenses produced by those methods, in which method the lens flexure is taken into account. One advantage of the method of the invention is that's it is insensitive to the lens' back surface design and, thus, does not require complex back surface designs. Additionally, the lens design can be optimized virtually, eliminating the need for iterative design-test on-eye-re-design cycles.

In one embodiment, the invention provides a method for designing a contact lens comprising, consisting essentially of, and consisting of: a.) selecting an eye model; b.) selecting optical performance metrics for a lens on-eye using the model eye; c.) providing a first lens having a first design, the design comprising at least a first optical zone; d.) simulating the first lens' flexure on-eye to determine a shape and performance measurements for the first lens on-eye; and e.) comparing the performance metrics selected in step b.) with the performance measurements of step d.) to determine a difference in the metrics.

In a first step of the method of the invention, an eye model is selected in order to determine desired optical performance of a lens-eye system. The eye model may be any suitable, known model such as an eye model based on a population average or on measurement of an individuals' eye. Eye models useful in the method of the invention must contain a topographical description of the front surface of a cornea and a representation of the optical characteristics of the eyeball suitable for optical analysis. The eye model may take a variety of shapes including, without limitation, anatomically based or represented as a wavefront. Regardless of the form of the eye model, the model must permit computation of the optical properties of an image in the image plane, or retina, so that it can be compared to performance metrics. Examples of suitable eye models include, without limitation, the Liou-Brennan model as disclosed in, inter alia, Liou, H and N. A. Brennan, "Anatomically Accurate, Finite Model Eye for Optical Modeling", *J. Opt, Soc. Am. A*, 14(8), pp 1684-1695 (1997) and the Navarro model as disclosed in, inter alia, Navarro, R., Santamaria J. and J. Bescos, "Accommodation—Dependent Model of the Human Eye With Aspherics", *J. Opt, Soc. Am. A*, 2(8), pp 1273-1281 (1985).

In a second step of the method of the invention, optical performance metrics are selected. The selected metrics are those desired by considering a lens on the model eye. The performance metrics may be any known metrics including, without limitation, Modulation Transfer Function ("MTF") curves, Visual Strehl, and the like.

In a third step of the invention, a first lens design is provided. The first lens design is composed of at least the optical zone of one surface of the desired lens. More preferably, the design is composed of the fully constrained geometry of the lens, meaning that the geometry of the lens is completely described and all of its degrees of freedom are constrained. The first design can be provided by using any number of commercially available optical design software including, without limitation CODE V™, ZEMAX™, OSLO™, and the like. The design of the lens is based on selected desired performance metrics measured using modulation transfer function ("MTF"), Visual Strehl and the like. The lenses of the invention may have any of a variety of corrective optical characteristics incorporated onto the front and back surfaces. For example, the lens may have any one or more of spheric, aspheric, bifocal, multifocal, prismatic, or cylindric corrections.

The theoretical deformation of the lens on-eye and wrapped is then simulated. The simulation takes into account the forces present in the lens-eye system which forces include, without limitation, gravity, tear film pressure, lid pressure, lid movement, friction between the cornea and lens' back surface, displacement of points within the lens body due to mechanical stress, and lens strain due to lens dehydration.

Additionally, the properties of the lens material to be used may be, and preferably are, included as inputs into the simulation. More preferably, these inputs include the Young's modulus, Poisson's ratio, stress-strain curves, and density of the material, and variations of such inputs as a function of the characteristics of the eye environment including, without limitation, temperature, pH, humidity and the like. One ordinarily skilled in the art will recognize that the inputs selected for the material will depend upon the material used.

The lens wrapping is simulated using commercially available software capable of modeling the deformation of the lens on-eye. Suitable commercially available software includes, without limitation MSC.MARC™, ABAQUS™, and the like. The software must be suitable to allow the user to represent the lens as a Finite Element mesh, meaning a series of nodes and elements, and to apply a load-case, or a series of loads modeling in vivo forces that are applied to the lens while it is on-eye, to the nodes and elements. The typical lens will respond to the load-case by deforming and wrapping onto the eye until the lens arrives at a stable shape.

Once the stable shape is achieved, the nodes describing the deformed shape of the front and back lens surfaces are extracted and fit to a curve, for a two-dimensional simulation, or a surface, for a three-dimensional simulation, in a format that can be imported into the analysis software being used. One ordinarily skilled in the art will recognize that the use of a two-dimensional or three-dimensional simulation will depend on the shape of the eye and the lens. For example, a non-rotationally symmetric lens, such a toric lens, will require use of a three-dimensional model. Any suitable numerical method to fit a curve or surface to a series of points may be used as, for example, a least square fitting method. Suitable commercially available software for use for this purpose includes, without limitation, MATHMATICA™, MATLAB™, MATHCAD™, and the like.

The desired performance metrics are then compared with the simulated on-eye performance. The wrapped shapes of the front and back surfaces of the lens are imported into suitable commercial software available such as, without limitation, ZEMAX™, OSLO™, CODE V™, and the like. If the simulated on-eye performance meets or exceeds the desired metrics, the lens design is acceptable. If the desired metrics are not met or exceeded, the first design is modified to provide a second lens with a second design that compensates for the difference between the selected metrics and those obtained with the first lens design and the last two steps of the method are repeated. This iteration may be carried out until an acceptable design results. One ordinarily skilled in the art will recognize that the modification of the design may involve one or more of modifying one or more radii of curvature, lens thickness, and lens material characteristics. Alternatively, an optimizing routine may be used to automatically optimize the lens design rather than manually iterating through the designs. As an example of this, a genetic algorithm may be used to simultaneously optimize multiple variables, such as the radii of curvature and the conic constants. Suitable genetic algorithms are available in the literature including, without limitation, in Colin R. Reeves and Jonathan E. Rowe, "Genetic-Algorithms—Principles and Perspectives: A Guide to Ga Theory" (2004).

The lenses designed by the method of the invention are soft contact lenses and may be made using any of the known materials and methods conventionally used in making soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens material contains a siloxane functionality, including, without limitation, polydimethyl siloxane macromers, methacryloxypropyl polyalkyl siloxanes, and mixtures thereof, a silicone hydrogel or a hydrogel, made of monomers containing hydroxy groups, carboxyl groups, or combinations thereof. Materials for making soft contact lenses are well known and commercially available. Preferably, the material is acquafilcon, etafilcon, genfilcon, lenefilcon, balafilcon, lotrafilcon, or galyfilcon.

The invention will be clarified further by a consideration of the following, non-limiting examples.

EXAMPLES

Example 1

The method of the invention is used to design a −3.00 diopters axi-symmetric spherical lens made of etafilcon A. An anatomically based model eye is chosen having a front corneal surface that is a 7.84 mm/−0.26 conic surface. The performance metrics selected is polychromatic MTF.

A nominal, single vision lens is designed in air. The lens has a refractive index of 1.4, a base curve radius of 8.3 mm, a center thickness of 0.084 mm and a spherical front radius of 8.87 mm. The lens is meshed into a Finite Element model and hyperelastic material characteristics are applied to the lens elements. The boundary condition used is back pressure of the lens base curve in order to force the back surface optical zone to conform to the cornea. In this simulation, the lids were assumed to be wide open, meaning that they do not interfere with the wrapping, and the swelling effects due to environmental changes and dehydration were ignored. The wrapping simulation is carried out until the lens is stable as determined by recording the displacement of a few nodes along the lens front surface and noting the time step at which the displacement of all node from their position was constant.

An extended odd asphere curve is fit to the nodes of the deformed front and back surfaces using a least square method. The extended odd asphere format used was:

$$Z = \frac{Cv \cdot r^2}{1 + \sqrt{1 - Cv^2(Cc+1) \cdot r^2}} + \sum_{i=1}^{N} \alpha \rho^i$$

wherein:
ρ is the normalized radial coordinate;
$\alpha_i$ are the polynomial constants;
Cv is the curvature; and
Cc is the conic constant.

Figure 1B:
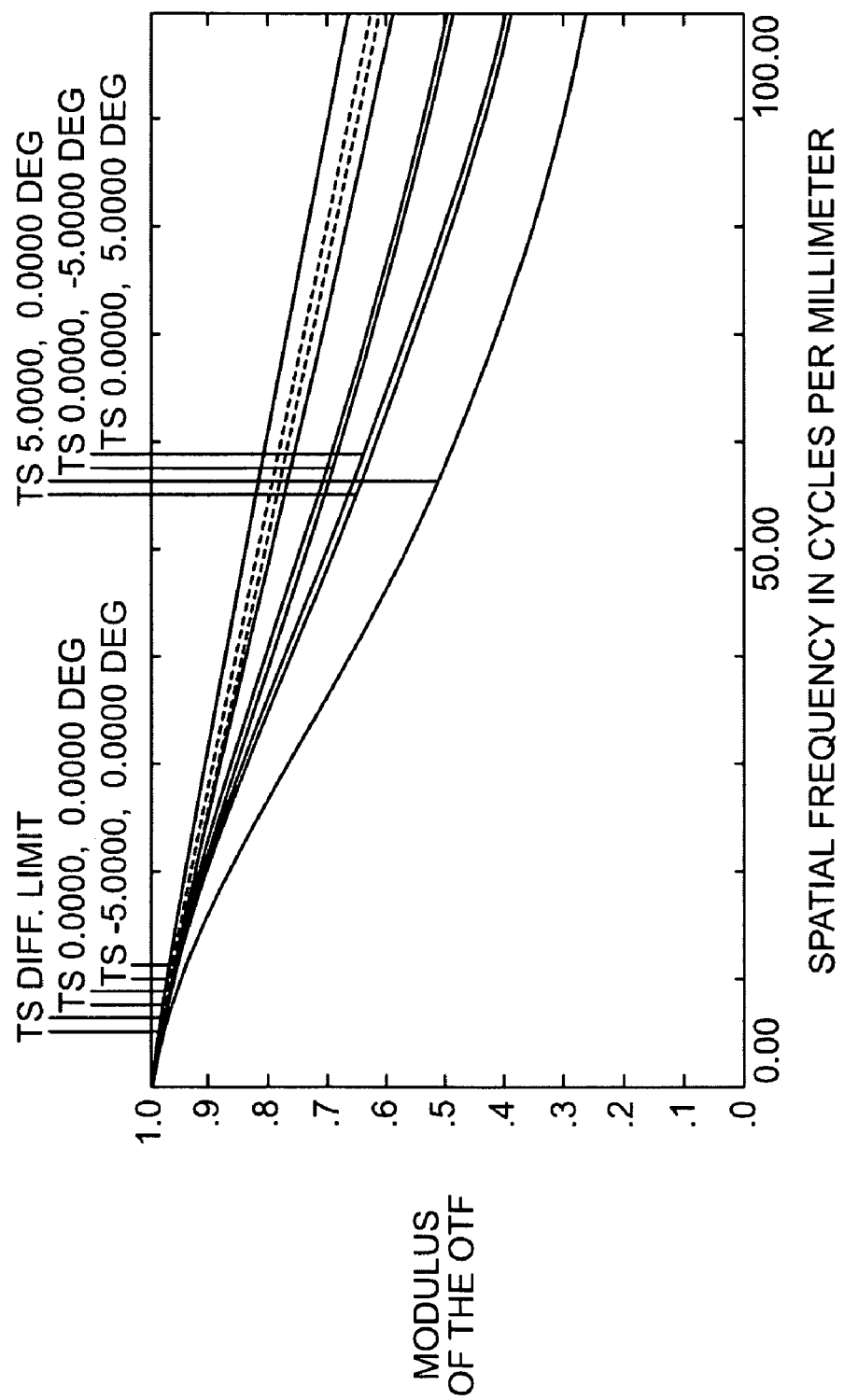
FIG. 1b is a polychromatic MTF graph of a lens-eye system with the lens decentered.

The polychromatic MTF curves were then generated for the wrapped lens—eye system. FIG. 1a is a graph of the MTF curves of the performance for the centered, nominal lens, which performance is acceptable. FIG. 1b is the performance for the decentered, nominal lens, which performance is not acceptable.

Figure 2B:
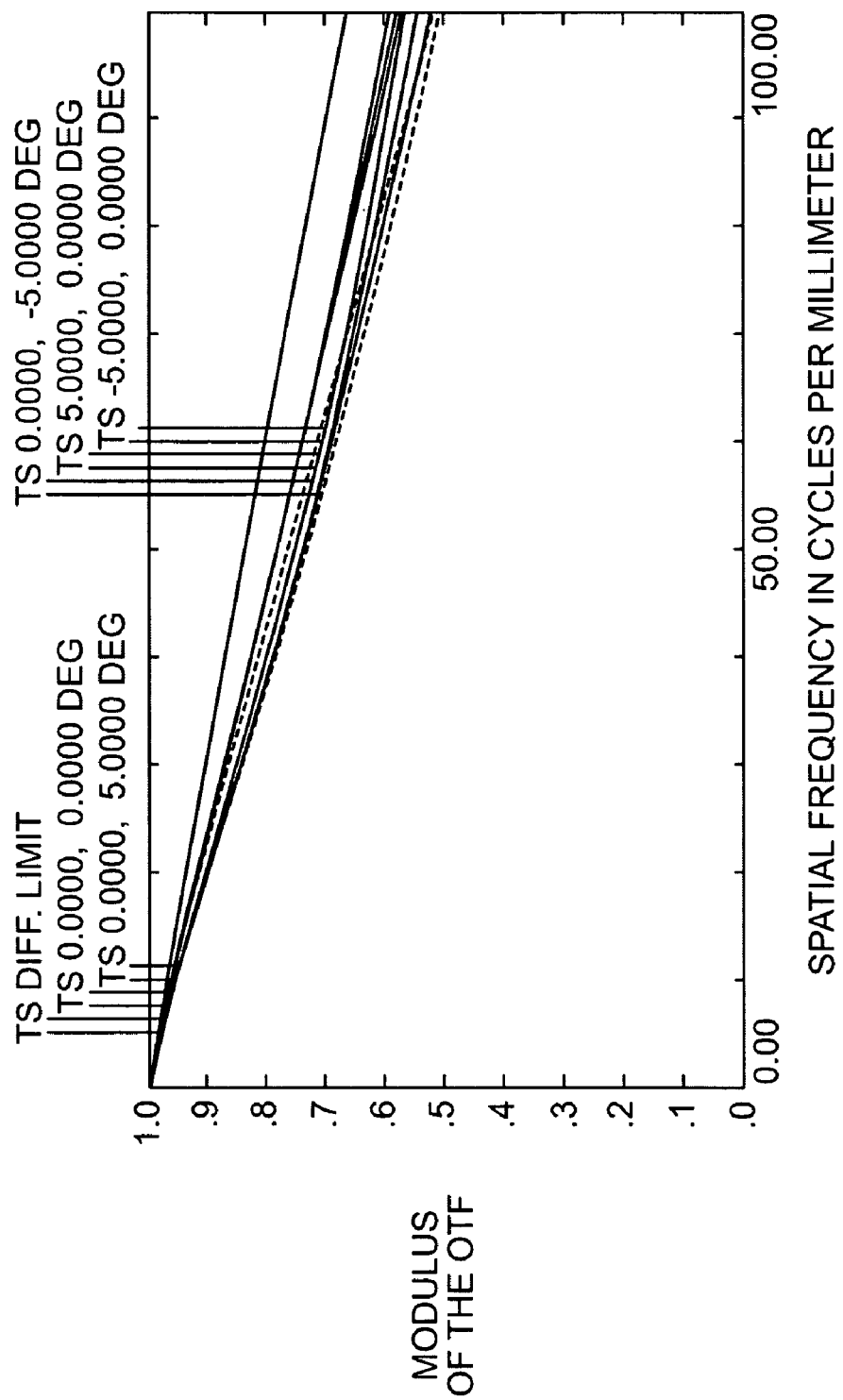
FIG. 2b is a polychromatic MTF graph of the lens-eye system of FIG. 1b in which the lens is optimized for wrapping.

The design was modified to make the front surface a conic with a radius of 8.35 mm having a conic constant of −0.13. The Finite Element analysis, wrapping simulation, and curve fitting were repeated. The polychromatic MTF curves for centered and decentered performance of the lens are shown in FIGS. 2a and 2b both of which are acceptable.

What is claimed is:

1. A method for designing a contact lens, comprising the steps of:
a.) selecting an eye model; b.) selecting optical performance metrics for vision correction with a lens on-eye using the model eye; c.) providing a first lens having a first design, the design comprising at least a first optical zone; d.) simulating the first lens' flexure on-eye to determine a shape and performance measurements for the first lens on-eye; e.) comparing the performance metrics selected in step b.) with the performance measurements of step d.) selecting the first design as the contact lens design if it meets the performance metrics and adapting the first design to better meet such performance metrics if it does not; wherein the model is based on representations of lenses as nodes and elements of a Finite Element mesh such that a load-case or a series of loads model in vivo forces applied to the lens while it is on-eye.

2. The method of claim 1, further comprising the steps of f.) providing a second lens having a second design that compensates for the difference in the metrics; g.) simulating the second lens' flexure on-eye to determine a shape and performance measurements for the second lens on-eye; and h.) comparing the performance metrics selected in step b.) with the performance measurements of step g.).

3. The method of claim 1, wherein the optical performance metrics comprise one or both of Modulation Transfer Function curves and Visual Strehl.

4. The method of claim 2, wherein the optical performance metrics comprise one or both of Modulation Transfer Function curves and Visual Strehl.

5. The method of claim 1, wherein the first lens design comprises at least an optical zone of one surface of the first lens.

6. The method of claim 2, wherein the first lens design comprises at least an optical zone of one surface of the first lens.

7. The method of claim 1, wherein the first lens design comprises a fully constrained geometry of the first lens.

8. The method of claim 2, wherein the first lens design comprises a fully constrained geometry of the first lens.

9. The method of claim 1, wherein the simulation takes into account (i) forces selected from the group consisting of gravity, tear film pressure, lid pressure, lid movement, friction between the cornea and lens' back surface, displacement of points within the lens body due to mechanical stress, and lens strain due to lens dehydration and (ii) properties selected from the group consisting Young's modulus, Poisson's ratio, stress-strain curves, and material density.

10. The method of claim 2, wherein the simulation takes into account (i) forces selected from the group consisting of gravity, tear film pressure, lid pressure, lid movement, friction between the cornea and lens' back surface, displacement of points within the lens body due to mechanical stress, and lens strain due to lens dehydration and (ii) properties selected from the group consisting Young's modulus, Poisson's ratio, stress-strain curves, and material density.

11. A lens provided according to the method of claim 1.

12. A lens provided according to the method of claim 10.

* * * * *